US007210394B2

(12) United States Patent
Yajima et al.

(10) Patent No.: US 7,210,394 B2
(45) Date of Patent: May 1, 2007

(54) METHOD AND APPARATUS FOR CONTROLLING AIR CYLINDER

(75) Inventors: Hisashi Yajima, Tsukuba-gun (JP); Nobuhiro Fujiwara, Tsukuba-gun (JP); Yoshiyuki Suzuki, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 11/142,094

(22) Filed: Jun. 2, 2005

(65) Prior Publication Data

US 2006/0037466 A1 Feb. 23, 2006

(30) Foreign Application Priority Data

Aug. 19, 2004 (JP) ............................. 2004-239968

(51) Int. Cl.
*F15B 9/09* (2006.01)
*G05B 19/19* (2006.01)

(52) U.S. Cl. ............................ 91/361; 91/459; 60/368; 700/56

(58) Field of Classification Search .................. 60/368; 91/361, 364, 459; 700/56
See application file for complete search history.

(56) References Cited

U.S. PATENT DOCUMENTS

| | | | | |
|---|---|---|---|---|
| 5,230,272 | A * | 7/1993 | Schmitz | 91/361 |
| 5,424,941 | A * | 6/1995 | Bolt et al. | 91/361 |
| 5,457,959 | A * | 10/1995 | Langguth et al. | 91/361 |
| 6,705,199 | B2 * | 3/2004 | Liao et al. | 91/363 R |
| 6,799,501 | B2 * | 10/2004 | Yo et al. | 91/361 |
| 7,062,832 | B2 * | 6/2006 | Yo et al. | 29/407.08 |
| 7,076,314 | B2 * | 7/2006 | Saitou | 700/56 |

* cited by examiner

*Primary Examiner*—Thomas E. Lazo
(74) *Attorney, Agent, or Firm*—Oblon, Spivak, McClelland, Maier & Neustadt, P.C.

(57) ABSTRACT

A method for controlling an air cylinder such that air is supplied to and exhausted from pressure chambers of the air cylinder by air servo valves. Pressures in the pressure chambers are detected by pressure sensors, signals of the detected pressures are feedback to a controller, and the degrees of opening of the air servo valves are adjusted by corresponding PID adjusters of the controller on the basis of the respective differences between instruction values and detection values. The displacement of the rod of the air cylinder is detected by a displacement sensor, and a detection signal of the displacement is fed back to the controller so that a gain of the PID adjuster is always changed in accordance with the detection signal of the displacement.

6 Claims, 3 Drawing Sheets

METHOD AND APPARATUS FOR CONTROLLING AIR CYLINDER

TECHNICAL FIELD

The present invention relates to a method and an apparatus for controlling an air cylinder by an air servo valve.

BACKGROUND ART

FIG. 4 illustrates an example of basic connection of an apparatus for controlling a thrust force of an air cylinder by an air servo valve. In the figure, with respect to reference numbers, 1 denotes an air cylinder, 2 denotes a three-position air servo valve connected to a head-side pressure chamber 1*a* of the air cylinder 1, 3 denotes a pressure air source connected to the air servo valve 2 and a rod-side pressure chamber 1*b* through a regulator 4, 5 denotes a controller controlling the air servo valve 2 by a PID adjuster 5*a* (see FIG. 5), 6 denotes a pressure sensor detecting an air pressure in the head-side pressure chamber 1*a* and feeding back a signal of the detected pressure to the controller 5, and 7 denotes a position sensor detecting the position of a piston 1*c* of the air cylinder 1.

In the apparatus, when the air servo valve 2 is switched to a first position, shown on the left of the figure, by the controller 5, and a pressure air is fed to the head-side pressure chamber 1*a* of the air cylinder 1, the piston 1*c* and a rod 1*d* of the air cylinder 1 move forward to the right in the figure. On this occasion, a pressure in the head-side pressure chamber 1*a* is detected by the pressure sensor 6, the position of the piston 1*c* is detected by the position sensor 7, and respective detection signals are fed back to the controller 5. Then, by applying a necessary gain (amplification) on a difference between a pressure instruction value and the detection value of the pressure in the PID adjuster 5*a* of the controller 5, and controlling the air servo valve 2, thrust control in accordance with the position of the piston 1*c* is performed. On this occasion, the air servo valve 2 is opened at the degree of opening in accordance a control signal having the gain applied thereon, and the pressure in the pressure chamber 1*a* of the cylinder 1 is controlled with a rate of airflow according to the degree of opening.

FIG. 5 is a block diagram of the apparatus, for controlling a thrust force of the air cylinder 1 by controlling the pressure in the pressure chamber 1*a*. With respect to reference characters in the figure, "Pi" is an instruction value, "Kp" is a proportional gain of the PID adjuster 5*a*, "G(S)" is a transfer function of the air servo valve 2, "V" is a volume of the pressure chamber, "1/VS" is a transfer function of the air cylinder 1, "a" is a constant, "T" is a time constant, "s" is Laplace operator, "Q" is a manipulated variable, "Po" is a controlled variable, and "Kc" is a feedback gain. The block diagram will be described in detail later, in association with the description of the present invention.

DISCLOSURE OF THE INVENTION

Meanwhile, in the case of controlling an air cylinder by the air servo valve as described above, it is difficult to accurately control the air cylinder with a known control type, because of poor response due to a steady-state difference between an instruction value and a measurement value, and to influence of a disturbance. Especially, since the volume (tank volume) of the pressure chamber serving as a load changes dramatically in accordance with a position change of the piston, there is a problem that the control of the air cylinder is not smoothly performed. Also, there is a problem that a small or large volume of the pressure chamber causes an unstable or poor response control system, respectively.

Accordingly, in order to solve the problems of the known control type, the object of the present invention is to provide an innovative control technique with which an air cylinder is accurately controlled since a steady-state difference is reduced, and a disturbance is also less influenced so as to improve response and stability.

Means for Solving the Problems

In order to achieve the above object, the present invention provides a control method for controlling an air cylinder such that air is supplied to and exhausted from at least one pressure chamber of the air cylinder by at least one air servo valve; a pressure in the pressure chamber is detected by a pressure sensor; a signal of the detected pressure is fed back to a controller; and the degree of opening of the air servo valve is adjusted by at least one PID adjuster of the controller on the basis of a difference between an instruction value and a detection value, wherein a displacement of a rod of the air cylinder is detected by a displacement sensor; and only a gain of the PID adjuster is always changed on the basis of a detection signal of the displacement.

In this case, a proportional gain may be changed in proportion to the displacement of the rod.

According to the present invention, air is possibly supplied to and exhausted from the two head-side and rod-side pressure chambers of the air cylinder by the two respective air servo valves, and gains of the PID adjusters corresponding to the respective air servo valves may be changed in accordance with a detection signal of the displacement from the displacement sensor.

Also, in order to implement the foregoing method, the present invention provides a control apparatus of an air cylinder, which includes an air cylinder; at least one air servo valve supplying and exhausting air to and from at least one pressure chamber of the air cylinder; a pressure sensor detecting a pressure in the pressure chamber; a displacement sensor detecting a displacement of a rod of the air cylinder; and a controller controlling the air servo valve with at least one PID adjuster on the basis of a difference between a detection value of the pressure fed back from the pressure sensor and an instruction value, wherein a gain of the PID adjuster is always changed in accordance with a detection signal of the displacement from the displacement sensor.

In this case, the proportional gain may be changed in proportion to the displacement of the rod.

Further, the present invention also provide a control apparatus including the two air servo valves and the two pressure sensors, each pair connected to either one of the head-side and rod-side pressure chambers of the air cylinder; the two PID adjusters corresponding to the respective air servo valves; and the single displacement sensor.

According to the present invention, since the displacement of the rod of the air cylinder is detected by the displacement sensor, and only the gain of the PID adjuster is always changed on the basis of a detection signal of the displacement, even when the volume of the pressure chamber of the air cylinder is dramatically changed, or even when the volume of the chamber is small or large, due to controllability similar to that of adaptive control; a steady-state difference is reduced, and a disturbance is also less influenced, whereby response and stability are improved, resulting in accurately controlling the air cylinder.

BEST MODE FOR CARRYING OUT THE INVENTION

Figure 1:
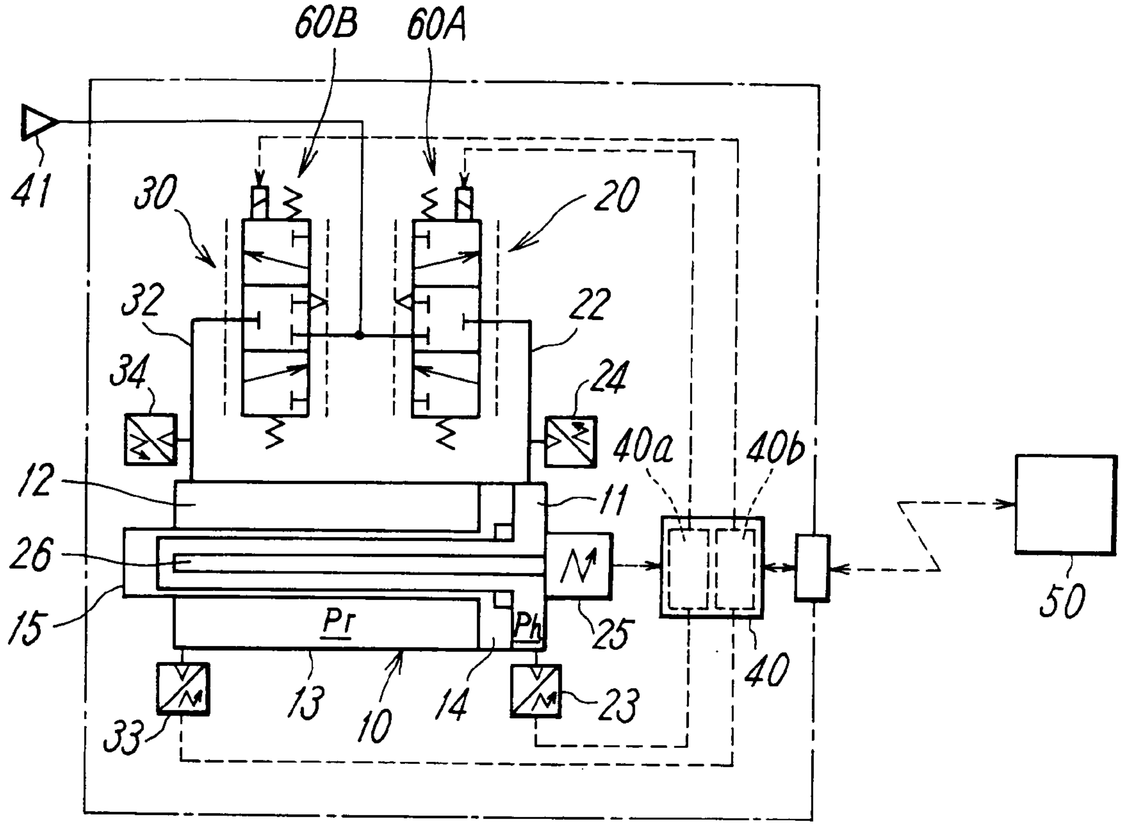
FIG. 1 is the overall connection diagram of a cylinder control apparatus according to an embodiment of the present invention.

FIG. 1 shows a cylinder control apparatus according to an embodiment of the present invention, in which an air cylinder 10 is used as a welding air servo gun by way of example.

More particularly, the control apparatus includes the air cylinder 10 making up the welding gun; head-side and rod-side air servo valves 20 and 30 respectively connected to head-side and rod-side pressure chambers 11 and 12 of the air cylinder 10; a controller 40 outputting a control signal to these air servo valves 20 and 30; and an external controller 50 externally providing an instruction to the controller 40 and controlling both air servo valves 20 and 30 with the controller 40 so as to bring the air cylinder 10 in a desired operating state.

Also, the air cylinder 10 includes a cylinder tube 13; a piston 14 slidably inserted in the cylinder tube 13; and a piston rod 15 connected to the piston 14, and a workpiece is clamped by the piston rod 15. The cylinder tube 13 is a sealed cylindrical body and includes its head-side and rod-side pressure chambers 11 and 12 having the piston 14 interposed therebetween. The piston rod 15 extends hermetically through the cylinder tube 13 and to the outside. The piston rod 15 has one electrode member of the welding gun (not shown) placed at the end of the externally extended part thereof.

Air at a necessary pressure is fed to/discharged from the head-side pressure chamber 11 from/to the head-side air servo valve 20 through a flow path 22, and the head-side pressure chamber 11 has a head-side pressure sensor 23 connected thereto, for detecting its air pressure. Also, the head-side pressure chamber 11 has a probe 26 of a displacement sensor 25 disposed therein, inserted in the piston 14 from the head cover side, for detecting the drive position of the piston 14. Detection signals of the pressure and the displacement respectively detected by the head-side pressure sensor 23 and the displacement sensor 25 are fed back to the controller 40.

On the other hand, air is fed to/discharged from the rod-side pressure chamber 12 from/to the head-side air servo valve 30 through a flow path 32, and the rod-side pressure chamber 12 has a rod-side pressure sensor 33 connected thereto, for detecting a pressure of the air. A signal of the detected pressure from the rod-side pressure sensor 33 is fed back to the controller 40.

Each of the head-side and rod-side air servo valves 20 and 30 is a three-position, three-port valves practically having the same structure as each other, including a supply port introducing air from an air supply source 41, an output port outputting it, and an exhaust port exhausting it, and, if needed, opens each port at the degree of opening in accordance with an output signal from the controller 40 so as to feed the controlled pressure air to the corresponding pressure chamber.

As described above, signals of the detected pressures from the head-side and rod-side pressure sensors 23 and 33 and a detected position signal from the displacement sensor 25 are fed back to the controller 40. Also, operation modes of the piston 14 and instruction values of air pressures in both pressure chambers 11 and 12 in accordance with the operational position of the piston 14 and so forth are set with respect to a time diagram and stored in the controller 40. Thus, on the basis of instruction signals received from an external computer 50, the detection values fed back from the corresponding pressure sensors 23 and 33 and the instruction values are respectively compared by PID adjusters of head-side and rod-side control units **40*a* and 40*b* of the controller 40, necessary gains (amplifications) are applied on these differences, and the corresponding head-side and rod-side air servo valves 20 and 30 are controlled with these signals. On this occasion, the air servo valves 20 and 30 are opened at the degrees of opening in accordance with the corresponding gain-applied control signals, pressures Ph and Pr in respective pressure chambers 11 and 12 of the air cylinder 10** are controlled with rates of airflow in accordance with the degrees of opening, and a difference between these pressures is outputted as a thrust force.

Accordingly, the head-side air servo valve 20, the head-side pressure sensor 23, and the head-side control unit **40*a* make up a head-side control system 60A, and the rod-side air servo valve 30, the rod-side pressure sensor 33, and the rod-side control unit 40*b* make up a rod-side control system 60**B.

Meanwhile, reference numbers 24 and 34 in the figure denote pressure sensors disposed in the flow paths 22 and 32 extending from the air servo valves 20 and 30 to the corresponding pressure chambers.

Figure 2A:
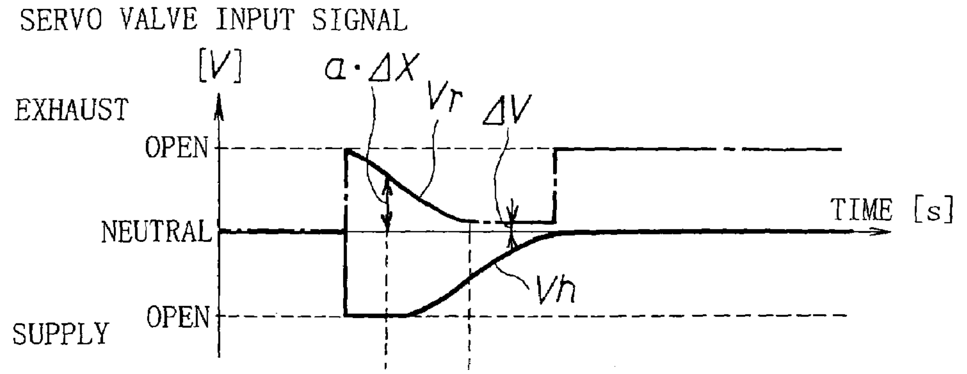
FIG. 2 is an example time diagram illustrating a control method according to the present invention.
Figure 2B:
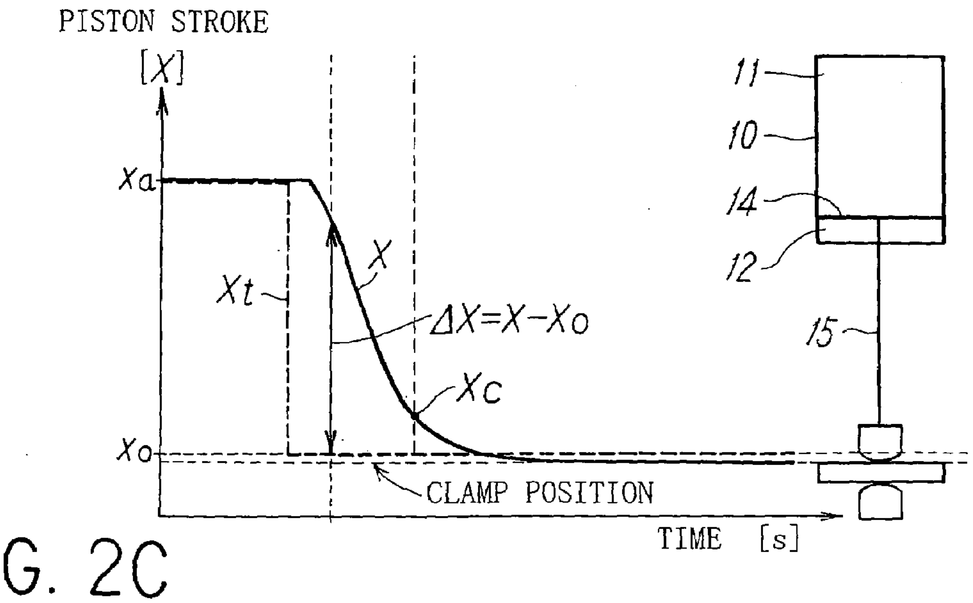
Figure 2C:
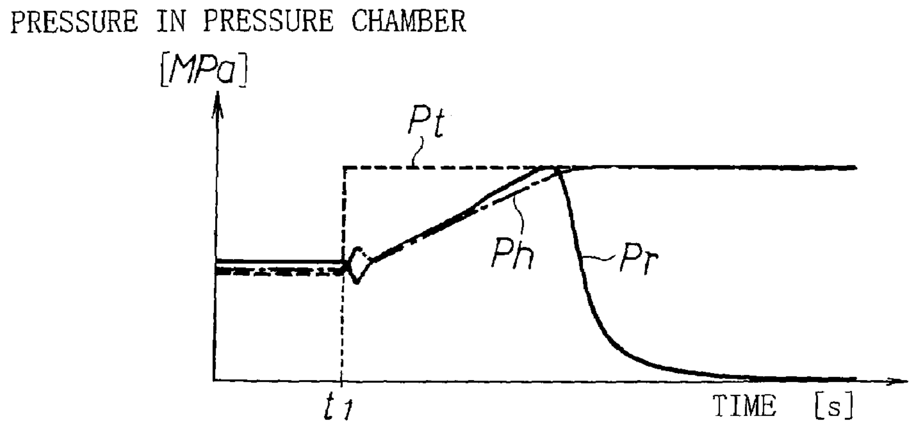

FIGS. 2(A) to 2(C) illustrate an example control operation of the air cylinder 10 with respect to a time diagram. FIG. 2(A) illustrates changes of input signals Vh and Vr applied on respective air servo valves 20 and 30, starting from an arbitrary stop position of the air cylinder 10, FIG. 2(B) illustrates a change in piston stroke X, and FIG. 2(C) illustrates changes in pressures Ph and Pr in the head-side and rod-side pressure chambers 11 and 12 of the air cylinder 10.

In FIG. 2(A), at time t1, while one input signal shown by curve Vh is applied on the head-side air servo valve 20, so as to fully or nearly fully open the air supply side of the air servo valve 20, and the other input signal shown by curve Vr is applied on the rod-side air servo valve 30 so as to fully open the air exhaust side of the air servo valve 30.

Hence, as shown in FIG. 2(B), the piston 14 located at an arbitrary stop position (Xa) is driven from that position towards a clamp position (Xo) serving as a target position Xt, at which a workpiece is clamped.

When the piston 14 is driven as described above and operated for clamping, the pressure of the head-side air servo valve 20 is controlled as shown in the figure, and that of the rod-side air servo valve 30 is controlled such that, by maintaining the degree of air servo valve opening so as to correspond to an input signal ($a \cdot \Delta X$, wherein "a" is a constant) in proportion to a difference ($\Delta X = X - Xo$), the piston speed of the cylinder can be smoothly reduced as the piston comes closer to the clamp position of the workpiece.

Meanwhile, reduction in the degree of opening of the head-side air servo valve 20 is also needed in accordance with the difference $\Delta X$.

When the piston speed is reduced to a satisfactory degree and the piston comes close to the clamp position of the workpiece also to a satisfactory degree, by fixing the degree of air servo valve opening (ΔV) of the rod-side air servo valve 30 at a fine constant value from the time when the piston reaches a set position (Xc), a clamping member comes into contact with the workpiece at a constant and low speed.

Figure 3:
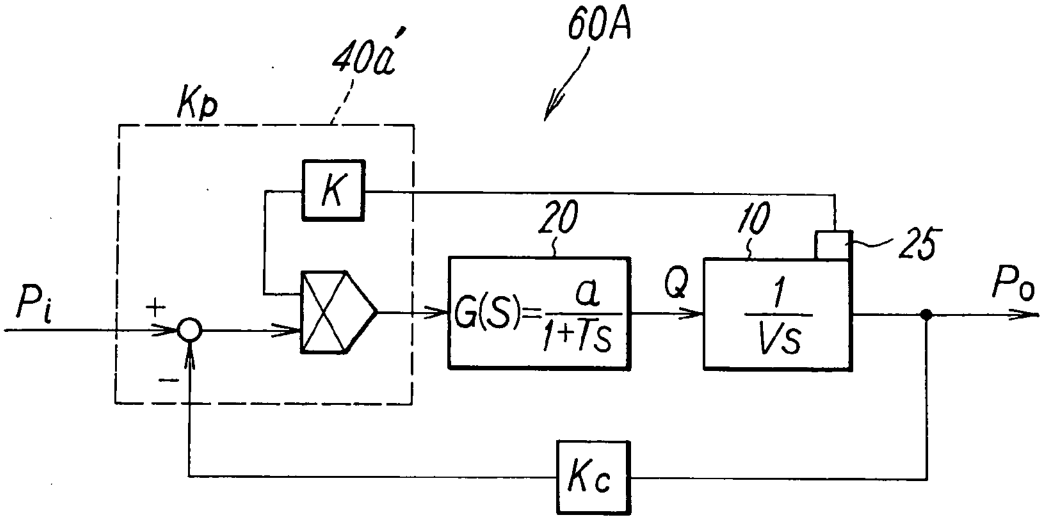
FIG. 3 is a block diagram of a head-side control system of the control apparatus shown in FIG. 1.

FIG. 3 is a block diagram of the head-side control system 60A of the control apparatus controlling the pressure of the head-side pressure chamber 11. The head-side control system 60A has a structure in which, while the pressure of the head-side pressure chamber 11 is controlled as described above, a detection signal of the displacement of the rod detected by the displacement sensor 25 is fed back to the head-side control unit 40*a* at the same time, and, on the basis of a detection value K of the signal, a gain Kp of a PID adjuster 40*a*' (not shown) is always changed in accordance with a change in a cylinder volume (a volume of the head-side pressure chamber) V.

In the meantime, since the basic pressure control performed by the control system 60A is practically the same as that performed by a known apparatus shown in FIGS. 4 and 5, the basic part thereof will be described with reference to a block diagram of the known apparatus shown in FIG. 5.

A transfer function of the overall block diagram of the known apparatus is given by Expression (1).

[Expression 1]

$$\frac{P_o(S)}{P_i(S)} = \frac{G(S)\cdot K_p}{V\cdot s + K_c\cdot K_p\cdot G(S)} \tag{1}$$

Also, in the foregoing Expression (1), when approximation with a first order system is applied on a transfer function of a valve so as to simplify it, it is given by G(S)=a/(1+T·s). As a result, Expression (1) is given by Expression (2), and its right side is given by Expression (3).

[Expression 2]

$$\frac{a}{1+T\cdot s}\cdot\frac{K_p}{V\cdot s+(K_c\cdot K_p\cdot a)/(1+T\cdot s)} = \frac{a\cdot K_p}{T\cdot V\cdot s^2+V\cdot s+a\cdot K_c\cdot K_p} \tag{2}$$

[Expression 3]

$$\frac{a\cdot K_p}{T\cdot V}\cdot\frac{1}{s^2+(1/T)s+(a\cdot K_c\cdot K_p)/(T\cdot V)} \tag{3}$$

A transfer function of an output pressure outputted to the air cylinder 10 is expressed by a secondary order system with respect to a pressure instruction value inputted in the PID adjuster and is given by the following Expression (4).

[Expression 4]

$$K\cdot\frac{1}{s^2+2\zeta\omega n\cdot s+\omega n^2} \tag{4}$$

In the above expression, ωn and ζ denote an undamped natural angular frequency and a damping coefficient and are given by the following Expressions (5) and (6), respectively.

[Expression 5]

$$\omega n=\sqrt{(K_c\cdot K_p\cdot a)/(T\cdot V)} \tag{5}$$

[Expression 6]

$$\zeta = \frac{1}{2}\cdot\sqrt{V/(K_c\cdot K_p\cdot a\cdot T)} \tag{6}$$

From these expressions, it is understood that the undamped natural angular frequency on and the damping coefficient ζ depend heavily on the volume of the cylinder.

Since the volume of the pressure chamber of the cylinder varies depending on the position of the piston, and this causes the undamped natural angular frequency ωon and the damping coefficient ζ to vary, the controllability of the cylinder control also changes, and the response of the control is poor because of being easily influenced by, for example, the steady-state difference between the instruction and measurement values, and a disturbance, thereby resulting in a difficulty in achieving accurate control.

However, upon focusing attention on the foregoing Expressions (5) and (6), it is understood that the cylinder volume V and the gain Kp of the PID adjuster are included in the denominator and numerator or the numerator and denominator of the corresponding expression. As such, when the gain Kp is adjusted in accordance with a change in the cylinder volume so as to make Kp/V constant, the undamped natural angular frequency and the damping coefficient do not vary, thereby resulting in constant controllability.

From such a viewpoint, according to the present invention, as shown in FIG. 3, a signal of the displacement of the rod detected by the displacement sensor 25 is fed back to the head-side control unit 40*a* so that the gain Kp of the PID adjuster 40*a*' is always changed in accordance with the detection value K of the signal. As a concrete method, it is sufficient that the detection value K of the displacement is multiplied by a value of the gain.

With this arrangement, even when the volume of the pressure chamber of the air cylinder 10 varies dramatically, due to controllability excellent the same as that of adaptive control, a steady-state difference and a disturbance are reliably prevented from occurrence, thereby achieving excellent response regardless of the position of the rod.

Meanwhile, while the gain of the PID adjuster of the head-side control system is changed in the foregoing embodiment, the same control can be performed for the rod-side control system.

Also, by using a speed sensor or an acceleration sensor as the displacement sensor for detecting a speed or an acceleration of the rod so as to serve as a displacement signal, the same control can also be performed.

Meanwhile, it can be understood that the art controlling the air pressure of the pressure chamber of the air cylinder 10 according to the above-described method is applicable no only to thrust control of the air cylinder 10 but also to positioning control of the rod.

The invention claimed is:

1. A method for controlling an air cylinder such that air is supplied to and exhausted from at least one pressure chamber of the air cylinder by at least one air servo valve; a pressure in the pressure chamber is detected by a pressure sensor; a signal of the detected pressure is fed back to a controller; and the degree of opening of the air servo valve is adjusted by at least one PID adjuster of the controller on the basis of a difference between an instruction value and a detection value, wherein a displacement of a rod of the air cylinder is detected by a displacement sensor and a detection value is multiplied by a value of the gain of the PID adjuster, whereby only a gain of the PID adjuster is always changed on the basis of a detection signal of the displacement.

2. The control method according to claim 1, wherein a proportional gain is changed in proportion to the displacement of the rod.

3. The control method according to claim 1 or 2, wherein air is supplied to and exhausted from a head-side pressure chamber and a rod-side pressure chamber of the air cylinder by respective two air servo valves, and gains of the PID adjusters corresponding to the respective air servo valves are changed in accordance with a detection signal of the displacement from the displacement sensor.

4. A control apparatus of an air cylinder, comprising an air cylinder; at least one air servo valve supplying and exhausting air to and from at least one pressure chamber of the air cylinder; a pressure sensor detecting a pressure in the pressure chamber; a displacement sensor detecting a displacement of a rod of the air cylinder; and a controller controlling the air servo valve with at least one PID adjuster, on the basis of a difference between a detection value of the pressure fed back from the pressure sensor and an instruction value, wherein a detection value of the displacement sensor is multiplied by a value of the gain of the PID adjuster, whereby only a gain of the PID adjuster is always changed in accordance with a detection signal of the displacement from the displacement sensor.

5. The control apparatus according to claim 4, wherein a proportional gain is changed in proportion to the displacement of the rod.

6. The control apparatus according to claim 4 or 5, comprising: two air servo valves and two pressure sensors, each pair connected to either one of the head-side and rod-side pressure chambers of the air cylinder; two PID adjusters corresponding to the respective air servo valves and the displacement sensor.

* * * * *

UNITED STATES PATENT AND TRADEMARK OFFICE

CERTIFICATE OF CORRECTION

PATENT NO. : 7,210,394 B2 
APPLICATION NO. : 11/142094
DATED : May 1, 2007
INVENTOR(S) : Hisashi Yajima et al.

Figure 4:
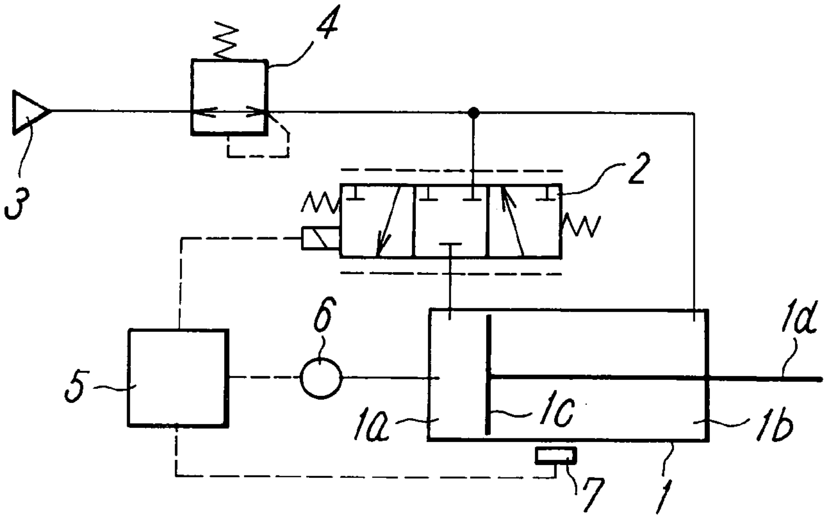
FIG. 4 is a connection diagram of a known cylinder control apparatus.
Figure 5:
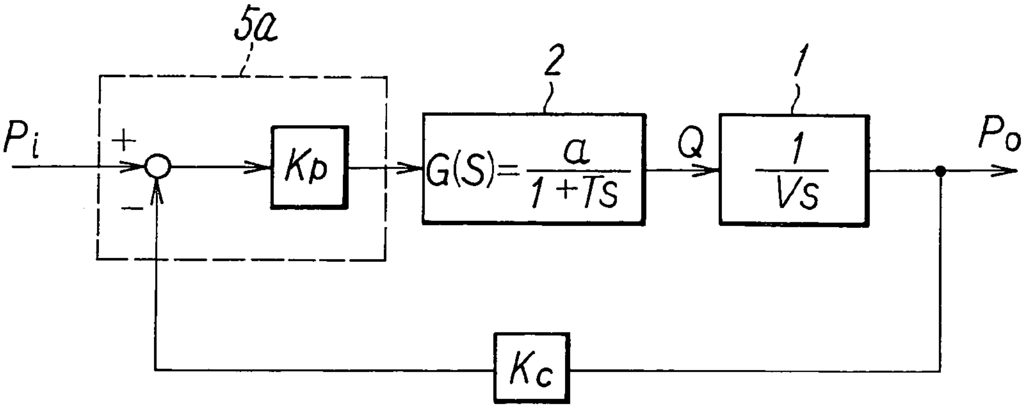
FIG. 5 is a block diagram of the control apparatus shown in FIG. 4.
Figure 3:
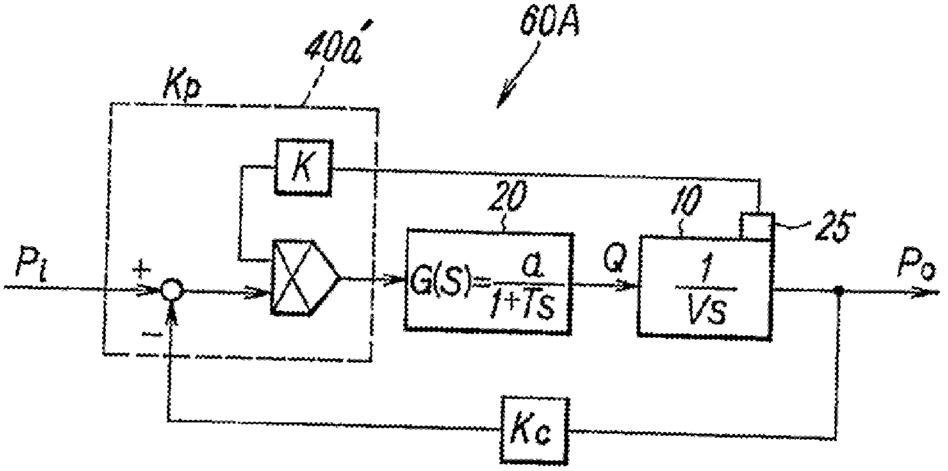
Figure 4:
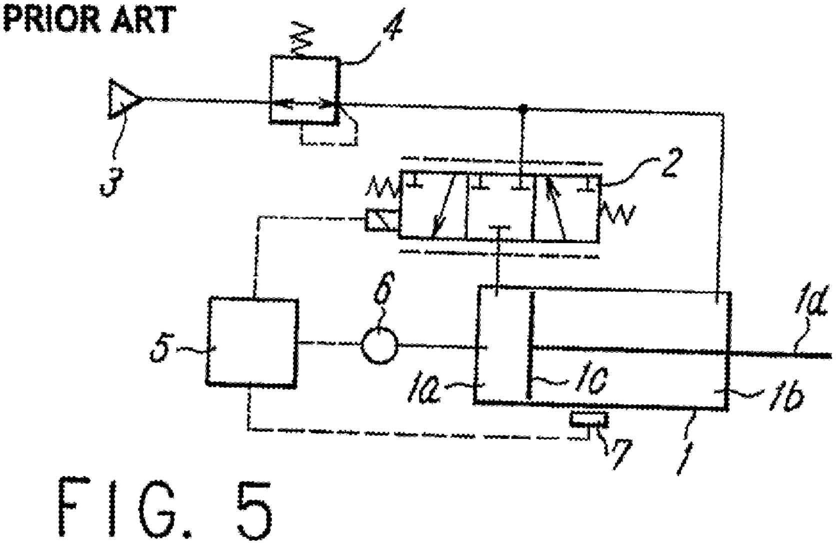
FIG. 4 PRIOR ART
Figure 5:
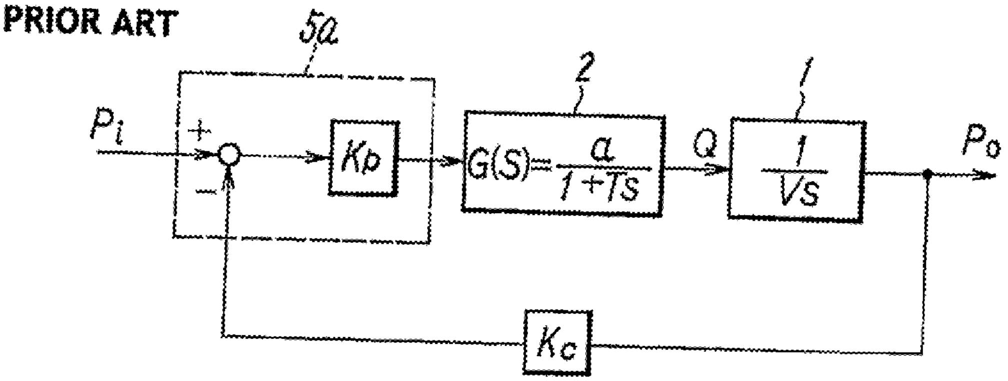
FIG. 5 PRIOR ART

It is certified that error appears in the above-identified patent and that said Letters Patent is hereby corrected as shown below:

Figs. 4 and 5 have been labeled --PRIOR ART-- as shown on the attached page.

F IG. 3

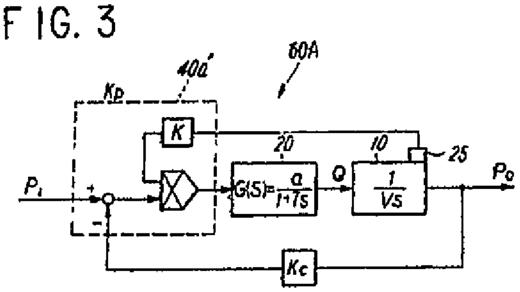

F I G. 4

PRIOR ART

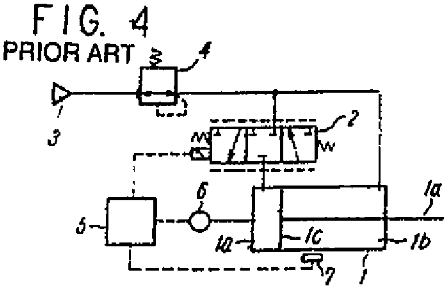

F I G. 5

PRIOR ART

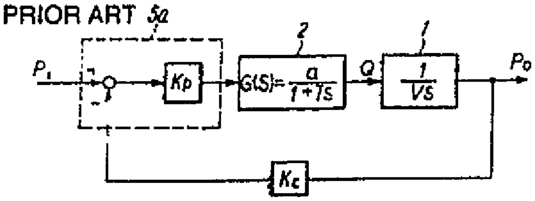

Signed and Sealed this

Twenty-third Day of October, 2007

JON W. DUDAS

*Director of the United States Patent and Trademark Office*